(12) United States Patent
Goedeke et al.

(10) Patent No.: US 8,664,134 B2
(45) Date of Patent: Mar. 4, 2014

(54) CRYSTALLIZING GLASS SOLDERS AND USES THEREOF

(75) Inventors: Dieter Goedeke, Landshut (DE); Peter Brix, Mainz (DE); Olaf Claussen, Undenheim (DE); Joern Besinger, Ludwigshafen (DE); Bastian Schoen, Landshut (DE)

(73) Assignee: Schott AG, Mainz (DE)

( * ) Notice: Subject to any disclaimer, the term of this patent is extended or adjusted under 35 U.S.C. 154(b) by 74 days.

(21) Appl. No.: 13/238,455

(22) Filed: Sep. 21, 2011

(65) Prior Publication Data

US 2012/0065049 A1   Mar. 15, 2012

Related U.S. Application Data

(63) Continuation-in-part of application No. 13/203,347, filed as application No. PCT/EP2010/001301 on Mar. 3, 2010.

(30) Foreign Application Priority Data

Mar. 4, 2009  (DE) .................. 10 2009 011 182
Feb. 15, 2010  (EP) ..................................... 10001512

(51) Int. Cl.
*C03C 3/068* (2006.01)
*C03C 3/062* (2006.01)
*C03C 3/064* (2006.01)
*C03C 8/14* (2006.01)
*C03C 8/02* (2006.01)

(52) U.S. Cl.
USPC ................ 501/78; 501/73; 501/77; 501/17; 501/21

(58) Field of Classification Search
USPC ........... 501/14, 15, 17, 21, 73, 74, 75, 76, 77, 501/78, 79
See application file for complete search history.

(56) References Cited

U.S. PATENT DOCUMENTS

| | | | |
|---|---|---|---|
| 4,788,045 A * | 11/1988 | Colombet et al. | 423/85 |
| 5,998,037 A * | 12/1999 | Sridharan et al. | 428/472 |
| 6,124,224 A | 9/2000 | Sridharan et al. | |
| 6,362,119 B1 * | 3/2002 | Chiba | 501/15 |
| 6,430,966 B1 | 8/2002 | Meinhardt et al. | |
| 6,532,769 B1 | 3/2003 | Meinhardt et al. | |
| 6,586,867 B2 | 7/2003 | Morishita et al. | |
| 7,521,387 B2 * | 4/2009 | Xue et al. | 501/15 |
| 2005/0147866 A1 | 7/2005 | Ko et al. | |
| 2006/0019813 A1 | 1/2006 | Yoshii | |
| 2008/0090715 A1 | 4/2008 | Badding et al. | |

FOREIGN PATENT DOCUMENTS

| | | | |
|---|---|---|---|
| DE | 292901 | 8/1991 | |
| DE | 292901 A5 * | 8/1991 | ............. C03C 3/066 |
| DE | 198 57 057 | 4/2000 | |
| DE | 101 22327 | 11/2002 | |
| DE | 10 2005 002435 | 7/2006 | |
| JP | 57-200247 | 12/1982 | |
| JP | 2002-104839 | 4/2002 | |
| JP | 2005-197242 | 7/2005 | |
| JP | 2007-161569 | 6/2007 | |
| JP | 2011-168480 | 9/2011 | |
| SU | 802220 | 2/1981 | |

OTHER PUBLICATIONS

M. J. Pascual et al: "Determination of the Viscosity—Temperature Curve for Glasses . . . " Physics and Chemistry of Glasses, vol. 42, No. 1, Feb. 2001, pp. 61-66 (in English).
Schott Electronic Packaging, Lab 17001b, VSM32673, Oct. 14, 2008 (With Eng. Translation).
Schott Electronic Packaging, Lab 17001a, VSM32623, Oct. 14, 2008 (With Eng. Translation).
N. Lahl et al: "Crystallisation Kinetics in AO- . . . " Jpurnal of Materials Science 35, 2000, pp. 3089-3096 (in English).
H. Scholze et al: "Der Einfluss Von Viskositaet Und . . . " Ber. DKG 39, 1962, pp. 63-68 (With Eng. Abstract).

* cited by examiner

*Primary Examiner* — Noah Wiese
(74) *Attorney, Agent, or Firm* — Michael J. Striker

(57) ABSTRACT

A crystallizing glass solder for high-temperature applications, containing, in % by weight on an oxide basis: 45% to 60% of BaO, 25% to 40% of $SiO_2$, 5% to 15% of $B_2O_3$, 0 to <2% of $Al_2O_3$, and at least one alkaline earth metal oxide from the group consisting of MgO, CaO and SrO, wherein CaO is 0% to 5% and the sum of the alkaline earth metal oxides MgO, CaO and SrO is 0% to 20%, preferably 2% to 15%. The glass solder is preferably free from $TeO_2$ and PbO. Preferred embodiments of the glass solder contain from 3 to 15 wt. % of $Y_2O_3$ and have low porosity and high stability with respect to a moist fuel gas environment.

33 Claims, No Drawings

CRYSTALLIZING GLASS SOLDERS AND USES THEREOF

CROSS-REFERENCE

This U.S. National Stage Application is a continuation-in-part filed, under 35 U.S.C. §365, of PCT/EP 2010/001301, which was filed in Europe on Mar. 3, 2010, which claims foreign priority benefits based on DE 10 2009 011 182.4, filed on Mar. 4, 2009, in Germany, and EP 100 01 512.2 filed on Feb. 15, 2010 in Europe. The prior PCT International Application was not published under PCT article 21 (2) in English.

BACKGROUND OF THE INVENTION

1. The Field of the Invention

The present invention relates to crystallizing glass solders and composites, which are suitable in particular for high-temperature applications, and to applications thereof.

2. The Description of the Related Art

Glass solders are usually used for producing joints to connect, in particular, glass and/or ceramic components to one another, or to components made of metal. In the development of glass solders, the composition thereof is often selected so that the coefficient of thermal expansion of the glass solder corresponds approximately to that of the components to be connected to one another in order to obtain a joint which is stable in the long term. Compared to other joints, for example those composed of plastic, those based on glass solders have the advantage that they can produce a hermetic seal and can withstand relatively high temperatures.

Glass solders are generally often produced from a glass powder which is melted during the soldering operation and, together with the components to be connected, forms the joint under the action of heat. The soldering temperature is generally selected so as to correspond approximately to the hemisphere temperature of the glass or can usually deviate from the latter by ±20 K. The hemisphere temperature can be determined in a microscopic method using a hot stage microscope. It characterizes the temperature at which an originally cylindrical test specimen has fused together to form a hemispherical mass. The hemisphere temperature can be assigned a viscosity of about log $\eta$=4.6, as can be seen from the relevant technical literature. If a crystallization-free glass in the form of a glass powder is melted and cooled again so that it solidifies, it can usually also be re-melted at the same melting point. In the case of a joint comprising a crystallization-free glass solder, this means that the operating temperature to which the joint can be subjected in the long term must be no higher than the soldering temperature. In actual fact, the operating temperature in many applications has to be significantly below the soldering temperature since the viscosity of the glass solder decreases with increasing temperatures and a glass having a certain flowability may be forced out of the joint at high temperatures and pressures, with the result that the joint may fail.

For this reason, non-crystallizing glass solders for high-temperature applications must usually have a soldering temperature or hemisphere temperature that is even significantly above the later operating temperature. One problem which may arise as a result of the much higher soldering temperature in comparison with the later operating temperature is the damage to the components to be connected to one another. Therefore, glass solders which, though they have as low a soldering temperature as possible, nevertheless allow an operating temperature that is as high as possible are desired. This means that, after a first soldering operation, the desired glass solders should only be re-meltable at a higher temperature than the soldering temperature.

This cannot be readily achieved with non-crystallizing glass solders as such. Glass solders that meet such requirements can be obtained, however, if the base glass at least partially crystallizes during the soldering operation, wherein the crystalline phases may have properties that deviate significantly from the base glass, for example with respect to the thermal expansion, but, in particular, the temperature required for the re-melting generally should be significantly above that of the base glass. The properties of an at least partially crystallized glass solder can be influenced directly by the composition of the original base glass, but also by suitable fillers, which generally have a crystalline structure and are added to the solder glass. The mixture of glass solder and filler is referred to in this disclosure as a composite.

The crystallization properties of the glass solder and/or composite are of outstanding importance for the processing properties when creating the joint and for the durability of the joint. The joining process generally comprises heating up to a joining temperature, introducing the glass solder at the joining temperature into the site of the joint and a crystallization phase in which the workpiece and glass solder are kept at a crystallization temperature below the joining temperature. The glass solder should optimally not yet crystallize during the heating, or only slowly, since it otherwise does not wet very well the surfaces to be joined, which would have to be compensated by a much higher joining temperature. Metallic elements involved in the joint could undergo undesired oxidation reactions as a result of increased joining temperatures. A resultant oxide film of a certain thickness may already peel off during the soldering operation and thus prevent a sealed connection. Furthermore, at such high soldering temperatures, there is increased vaporization of Cr from steels which often constitute an element of the components of the joint. During the cooling down of the temperature in the crystallization phase, a crystallization should take place as quickly as possible, but optimally the glass solder should not be completely crystallized but retain an amorphous, vitreous phase. This residual glass phase prevents brittle characteristics of the glass solder and can even contribute to healing cracks in the joint.

One field of use of such glass solders and/or composites is, for example, that of joints in high-temperature fuel cells, which can be used for example as an energy source in motor vehicles. An important type of fuel cell is, for example, the SOFC (solid oxide fuel cell), which can have very high operating temperatures of up to approximately 1000° C. The joint comprising the glass solder is usually used for producing fuel cell stacks, i.e. for connecting a plurality of individual fuel cells to form a stack. Such fuel cells are already known and are continually being improved. In particular, the trend in present-day fuel cell development is generally in the direction of lower operating temperatures. Some fuel cells already achieve operating temperatures below 800° C., so that a lowering of the soldering temperatures is possible and also desirable because of the resulting low thermal stress of the SOFC components during the soldering process.

Apart from the high-temperature resistance and the processing properties of the glass solders, a low electrical conductivity of the glass solders is required, for example in the high-temperature fuel cell, which generally requires alkali-free solders.

Furthermore, in this area there is the requirement that the solders must be free from substances such as Pb, a very commonly used constituent of glass solders with a great influence on crystallization and processing properties.

DE 19857057 C1 describes an alkali-free glass-ceramic solder having a coefficient of thermal expansion $\alpha_{(20-950)}$ of from $10.0 \cdot 10^{-6}$ $K^{-1}$ to $12.4 \cdot 10^{-6}$ $K^{-1}$. The solder described there contains from 20 to 50 mol % of MgO. Glasses having a high MgO content are in practice highly susceptible to crystallization, which leads to compounds which crystallize rapidly and to a high degree. In the case of such rapid and substantial crystallization, it is difficult to ensure good wetting of the interconnecting material by the glass solder. However, this is necessary to be able to provide a joint which optimally satisfies the respective requirements.

Glass-ceramic solders are also described in U.S. Pat. No. 6,532,769 B1 and U.S. Pat. No. 6,430,966 B1. These are designed for soldering temperatures of approximately 1150° C. and contain from 5 to 15 mol % $Al_2O_3$. Such high soldering temperatures are undesirable for modern fuel cells, since they subject the metallic substrate materials and other temperature-sensitive materials to excessive loads.

DE 10 2005 002 435 A1 describes composite solders which consist of an amorphous glass matrix and a crystalline phase. However the glass matrix has a high content of CaO, which leads to relatively high viscosities, very great crystallization and high dielectric losses.

Glass and glass-ceramic sealing materials are commonly used in the case of planar high-temperature fuel cells, since these materials can be readily adapted in terms of their coefficients of thermal expansion and viscosities to the conditions and sealing partners. The high demands placed on the materials (high operating temperatures of up to 850° C., moist fuel gases, thermocycles) mean that materials which can satisfy these demands are required. The materials that are primarily used crystallize virtually completely at the operating temperatures. The crystallization then leads to undesirable changes to the properties in terms of the porosity and thermal expansion properties. These materials can often only undergo insufficient thermocycling and the fluctuating temperature loads lead to cracks in the microstructure. Another disadvantage is the often inadequate resistance of the glasses in a moist fuel gas atmosphere; particularly when the glasses have a very high boron content, or when the materials do not undergo sufficient "dense sintering" because of the premature crystallization.

Within this disclosure, the term "crystallizing glass solder" comprises glass solders which at least partially crystallize during the soldering process, or preferably in a subsequent process, while amorphous, vitreous phases may also still be present in the glass solder. Correspondingly, the state of the glass solders after processing is referred to as crystallized, even if amorphous, vitreous phases may still be present in the glass solder.

SUMMARY OF THE INVENTION

It is therefore an object of the present invention to provide an alkali- and lead-free solder glass, and a crystallizing glass solder or a composite containing this solder glass, which can be processed at a soldering temperature of at most approximately 1100° C., the viscosity of which after completion of the soldering process at operating temperatures up to approximately 850° C. is still high enough so that it is not forced out of the joint and/or does not flow out of it and its thermal expansion coefficient $\alpha_{(20-300)}$ in the temperature range from 20° C. to 300° C. in the crystallized state is in a range from $8.0 \cdot 10^{-6}$ $K^{-1}$ to $13.0 \cdot 10^{-6}$ $K^{-1}$, and is consequently adapted to suitable steels. The crystallizing glass solder should not crystallize when it is melted for introduction into the joint, and after the crystallization process should have a crystalline fraction of at least 20% by weight and at most 80% by weight.

Another object of the invention is to ensure that the linear thermal expansion of the crystallizing glass solder in the vitreous state and in the crystallized state does not differ excessively, since otherwise the crystallization process causes mechanical stresses in the fusion, putting the stability thereof at risk. Similarly, during the crystallization there must not be any formation of undesired crystal phases with greatly differing thermal expansion, which may lead to mechanical destruction of the joint.

It is a further object of the present invention to provide a glass solder which, in the sintered state, has a low porosity and is stable with respect to a moist fuel gas atmosphere, for example like the atmosphere in a fuel cell.

It is an additional object of the present invention to provide a glass solder with an amorphous residual content which ensures a good bond to the interconnector, which is able to heal microcracks that have arisen as a result of the viscous flow of the vitreous phase at high temperatures and which remains in the sealing glass gias during operation of a SOFC (fuel cell).

These objects are attained by the crystallizing glass solders and/or composites according to the independent claims. Preferred embodiments are described and claimed in the dependent claims.

According to the invention, the crystallizing glass solder has a composition, in % by weight on an oxide basis, of: 45% to 60% BaO, 25% to 40% $SiO_2$, 5% to 15% $B_2O_3$, 0% to <2% $Al_2O_3$, and at least one alkaline earth metal oxide from the group comprising MgO, CaO and SrO, wherein CaO is 0% to 5% and the sum of the alkaline earth metal oxides MgO, CaO and SrO is 0% to 20%, preferably 2% to 15%. Further additions are possible. For the purposes of the invention, the term crystallizing glass solder comprises both the amorphous base glass, which is used as solder glass before the soldering operation, and the material produced from the base glass during the soldering operation, which may, inter alia, be vitreous, crystallized, partially crystallized, glass-ceramic or in some other form.

Unless otherwise indicated, all compositions listed in the following are given in % by weight on an oxide basis. In other words, unless otherwise indicate, the percentages of the oxide ingredients are given in % by weight.

According to the invention, the crystallizing glass solder contains 45% to 60% of BaO. With barium oxide fractions greater than 60%, the glass solder may have a tendency to form barium silicate crystals. With a barium oxide fraction of less than 45%, the desired coefficient of thermal expansion may not be achieved. Depending on further constituents of the glass and their atomic weights, the most stable glasses in terms of crystallization, with a thermal expansion according to the invention, are obtained with a barium oxide content of from 50% to 58%. The crystallizing glass solder according to the invention therefore preferably contains 45% to 58% of BaO.

The crystallizing glass solder contains at least one alkaline earth metal oxide from the group comprising MgO, CaO and SrO. With these components, the crystallization behavior and the thermal expansion of the glass solder can be influenced. It has surprisingly been found with the glass solders according to the invention that the tendency to crystallize can be suppressed by adding MgO in place of $SiO_2$. A further positive effect is that the dielectric loss can be lowered by glasses containing MgO. Furthermore, the melting temperatures and the glass transition temperature can be lowered by the network-transforming alkaline earth metal oxides. Supplying MgO in place of $Al_2O_3$ or $SiO_2$ also has the effect of increasing the coefficient of thermal expansion, and consequently represents a simple possible way of adapting the glass solder to the components to be fused. The glass solder according to the invention therefore contains up to 20% of MgO and/or CaO and/or SrO and preferably 2% to 15% of MgO and/or CaO and/or SrO.

Apart from the crystallization behavior, the $B_2O_3$ content also positively influences the melting behavior, and consequently the glass melt. The $B_2O_3$ content is therefore at least 5%. On the other hand, an excessive $B_2O_3$ content may have adverse effects on the chemical resistance of the glass solder. Furthermore, with $B_2O_3$ contents above 15%, there may be vaporization of boron oxide from the glass solder, which is likewise undesired. The crystallizing glass solder therefore preferably contains 5% to 15% of $B_2O_3$.

It has been found that an $Al_2O_3$ content above 2% of a glass solder has adverse effects on its properties. The $Al_2O_3$ content in the solder of the present invention is therefore restricted to <2% of $Al_2O_3$. The small fraction of $Al_2O_3$ in the crystallizing glass solder according to the invention has the effect that undesired crystal phases, such as $BaAl_2Si_2O_8$, known as barium feldspars, cannot form. Two phases of the $BaAl_2Si_2O_8$ compound, with greatly differing coefficients of thermal expansion, exist: celsian with a coefficient of thermal expansion of $2.2 \cdot 10^{-6}$ $K^{-1}$ and hexacelsian with a coefficient of thermal expansion of $7.1 \cdot 10^{-6}$ $K^{-1}$, the hexacelsian being stable at higher temperatures than the celsian. During the cooling of the glass solder, for example in a joint of a fuel cell, a transformation of the hexacelsian phase into the celsian phase may occur below 300° C. This transformation involves a sudden change in volume of approximately 3% or more, whereby strong mechanical stresses occur and the joint may be destroyed. The glass solder according to the invention prevents the creation of these crystal phases and consequently increases the fail safety of the joints.

A further undesired crystal phase is $Mg_2Al_4Si_5O_{18}$, also known as cordierite, which may occur in the presence of $Al_2O_3$ and MgO. Cordierite has a very small coefficient of thermal expansion of about $1.5 \cdot 10^{-6}$ $K^{-1}$. This crystal phase with its expansion behavior does not suit most high-temperature applications, such as joints in fuel cells. The crystallizing glass solder according to the invention also prevents the creation of the cordierite phase by its low content of $Al_2O_3$.

It has also been recognized that, in particular, an excessive CaO content of the glass solder has adverse effects on its properties. CaO has a very strong influence on the crystallization behavior, since it leads to glasses with lower crystallization activation energy. As a result, the glasses obtained with a higher CaO content have an excessive tendency to crystallize and crystallize almost completely just when they are heated up to the soldering temperature, and not only after the solder or the composite has been introduced into the soldering site. Corresponding solders therefore poorly wet the parts to be connected and there is an increased risk of failure of the joint. The tendency to crystallize can be suppressed by low PbO contents, but the solder glasses of the present invention are intended to be lead-free.

A further disadvantage is that, with CaO contents above 5%, during the crystallization not only the dominant, desired barium silicate crystal phase but also a further Ca-containing crystal phase may be precipitated. This is disadvantageous, on the one hand, because the formation of more than one crystal phase may be disadvantageous for the long-term stability of the solder: here there is the risk of excessive after-crystallization and/or a reaction of crystal phases, so that the thermo-mechanical properties of the solder may change. At temperatures >600° C., there may be reactions between $CaSiO_3$ (wollastonite) and $CO_2$ to form $CaCO_3$ and $SiO_2$. The carbonate phases in turn can decompose at temperatures from 900° C. and contribute to undesired bubble formation. On the other hand, the crystal phase is critical, since it has a low coefficient of thermal expansion of only $5.4 \cdot 10^{-6}$ $K^{-1}$, which in terms of its expansion behavior is not adapted to the high-temperature application. The CaO content in the case of the present glass solders is therefore from 0% to 5%.

For the reasons mentioned above, the CaO content is preferably 0% to 3%. In this range, glass solders that are distinguished by good processing properties, and in particular good wetting behavior, and primarily form the crystal phase $Ba_4Si_6O_{16}$ in the crystallization process after the joining process are obtained.

The sum of the glass formers principally determines the crystallization behavior. Stable glasses are obtained in the glass system according to the invention with a sum of the fractions of the glass formers $SiO_2$ and $B_2O_3$ of 30% to 53%. The crystallization properties can be significantly influenced by the further constituents of the glass. Depending on further constituents of the glass and their atomic weights, the most stable glasses in terms of crystallization are obtained with a sum of the fractions of $SiO_2$ and $B_2O_3$ of 36% to 51%. In a preferred embodiment, the crystallizing glass solder therefore has a sum of the fractions of $SiO_2$ and $B_2O_3$ of 36% to 51%.

The crystallizing glass solder according to the invention preferably has a coefficient of linear thermal expansion, $\alpha_{(20-300),G}$, in the vitreous state of $6 \cdot 10^{-6}$ $K^{-1}$ to $11 \cdot 10^{-6}$ $K^{-1}$, wherein the index G indicates the variable related to the amorphous, vitreous state. This means that the coefficient of thermal expansion of the base glass and/or of the glass solder that has not crystallized during the soldering operation has the range of values mentioned. In the crystallized state, i.e. when the glass solder has at least partially crystallized during the soldering operation, it preferably has a coefficient of thermal expansion, $\alpha_{(20-300),\kappa}$, of $8 \cdot 10^{-6}$ $K^{-1}$ to $13 \cdot 10^{-6}$ $K^{-1}$; wherein the index $\kappa$ designates the crystallized state.

Therefore, the crystallization process typically involves a small increase in the coefficients of thermal expansion. On account of the small differences in the thermal expansion before and after the crystallization, however, the crystallization process only introduces small mechanical stresses into the fusion, not putting the stability thereof at risk.

The crystallizing glass solder may also contain up to 0.5% of $V_2O_5$ and/or $Sb_2O_3$ and/or CoO. These additional substances bring about a significant increase in the adhesive strength of the glass solder on metal substrates.

A further preferred optional additional substance is $ZrO_2$ in an amount of up to 5%. $ZrO_2$ acts as a nucleating agent and the addition thereof can consequently be used to influence the crystallization behavior and also the crystal size. The composition of the solder glass is in this case preferably set such that it crystallizes slowly. If it already crystallized very strongly, there often would not be sufficient wetting. In particular, it should generally be possible when producing a joint for the solder glass to be introduced into the site of the connection to be soldered in a non-crystallized or partially crystallized form, since the temperature required for the wetting of the components to be fused is then lower.

The thermal expansion properties of the crystallizing glass solder correlate in particular with the molar ratio of $SiO_2$ to BaO. In a preferred embodiment, it is therefore provided that the molar ratio of $SiO_2$ to BaO is less than 2.5 and most particularly preferably less than 2.3. If the molar ratio of $SiO_2$ to BaO is over 2.5, the thermal expansion is generally inadequate and the target range of the thermal expansion can no longer be achieved even by fillers.

The crystallizing glass solder according to the invention preferably has a hemisphere temperature of from 850° C. to 1080° C., and can correspondingly be used approximately at this temperature for joining.

The crystallizing glass solder according to the invention is generally produced by milling the solder glass, after it has been prepared in a conventional glass melt, into a glass powder, which can be introduced into the joint for example in the form of a dispensable paste or a pre-sintered shaped body. The crystallizing glass solder produced from the melted solder glass preferably has an amorphous, non-crystalline state before the soldering process.

According to the invention before or during the further processing into the aforementioned pastes and sintered bodies, the crystallizing glass solder in powder form may additionally have added to it up to 35% by weight with respect to a total weight of glass solder and filler of a preferably crystalline filler, likewise in powder form, so that a composite is obtained. The properties of the composite can be positively changed in comparison to the properties of the filler-free glass solder, and set by the filler. For example, the filler, its grain size distribution, and of course its constituent amount influence the thermal expansion properties and the rate of crystallization.

Sanbornite ($BaSiO_3$), 3YSZ (yttrium-stabilized zirconium oxide), wollastonite ($CaSiO_3$) or enstatite ($Mg_2Si_2O_6$), or any desired combination of these substances, is preferably used as the filler. The addition of this filler allows adaptation of the coefficient of thermal expansion $\alpha_{(20-300),K}$ of the crystallized base glass, as can be seen in table II from the example B1. The coefficient of thermal expansion $\alpha_{(20-300),K}$ of the crystallized composite in the temperature range of 20° C. to 300° C. is in the range of $8 \cdot 10^{-6} K^{-1}$ to $12 \cdot 10^{-6} K^{-1}$, and the thermal expansion coefficient $\alpha_{(20-750),K}$ in the temperature range of 20° C. to 750° C. is in the range of $9.5 \cdot 10^{-6} K^{-1}$ to $14.5 \cdot 10^{-6} K^{-1}$.

The composites according to the invention preferably have a hemisphere temperature of from 850° C. to 1100° C.

Optimum strengths of a joint are achieved when the solder is optimally adapted in thermal expansion to the materials to be fused. Furthermore, a change in the coefficient of thermal expansion brought about by the crystallization process also must not produce excessive stresses in the solder. The glass solder according to the invention on the one hand ensures this by avoiding undesired phases, as already explained, and on the other hand the glass solder according to the invention and the composite produced from it are distinguished by the difference in the thermal expansion coefficient $\alpha_{(20-300)}$ before and after the crystallization process being less than $2 \cdot 10^{-6} K^{-1}$ and preferably less than $1 \cdot 10^{-6} K^{-1}$.

The crystallizing glass solder according to the invention and the composite obtained therefrom are distinguished by the fact that the proportion of the amorphous phase in the crystallized state is at least 10% by weight. By analogy with the filler-free crystallizing glass solder, the at least partially crystalline state of a composite after crystallization is referred to as crystallized even if amorphous vitreous phases may still be present. Even after crystallization, the present glass solders and composites have such an amorphous phase, which reduces the brittleness of the solder and thus advantageously increases the strength of the joint. Similarly, the amorphous phase allows small cracks in the solder glass connection to heal themselves.

On account of its physical properties, the crystallizing glass solder according to the invention is particularly suitable for producing high-temperature-resistant joints. High-temperature-resistant is understood for the purposes of the invention as meaning a temperature range of more than approximately 650° C. as a long-term-operating temperature. Such joints may be used particularly advantageously in fuel cells, in particular SOFCs. One example of an application in fuel cells is the connecting of individual SOFCs to form an SOFC stack.

According to the invention, preferred embodiments of the crystallizing glass solder contain from 0.1 or 0.5% to 14 or 15%, preferably from 5 to 15% or 5 to 8%, and most preferably from 3 to 7 or 8%, of $Y_2O_3$. These embodiments are especially preferred for fuel cell applications, because they have a low porosity and are stable with respect to a moist fuel gas atmosphere.

The crystallizable glass solder containing $Y_2O_3$ preferably contains, in percent by weight on the basis of oxide content, 22 to 29%, $SiO_2$; <2%, $Al_2O_3$; 6 to 12%, $B_2O_3$; 46 to 55%, BaO; 1 to 4%, MgO; and 5 to 15%, of $Y_2O_3$.

It has surprisingly been found that these embodiments of the glass solder are particularly stable with respect to crystallization. Their peak crystallization temperature is outside the typical temperature corridor of an anode-supported SOFC. The density of a sample sintered from powder is also near the value of a vitreous cast sample, which reveals a low porosity of the material.

Compared to embodiments of the glass solder without $Y_2O_3$, the glasses mentioned have a higher density and a lower inclination to crystallize. These advantages can be explained in particular by the $Y_2O_3$ content, which has a stabilizing effect on the glassy network. These solders also have a thermal expansion coefficient which is stable over time. Substitution or the introduction of CaO, which is also used widely for SOFC sealing glasses, leads to materials which undergo greater crystallization. Even after 500 h under moist fuel gas, there is no noticeable change in the microstructure of one embodiment of these glass solders. Crystallization products are primarily stable barium silicate phases.

The crystallizing glass solder and/or composite according to the invention may, however, also be used for producing sintered bodies with high temperature resistance. Processes for producing sintered bodies are adequately known. In general, the starting materials of the glass solder of the invention are mixed with one another in powder form, mixed with a generally organic binder and molded into the desired shape. Instead of the powder of the starting materials, an already melted glass according to the invention may be milled and mixed with the binder. The molded glass-binder body is then brought to the sintering temperature, the binder being able to burn out and the glass components being able to sinter together at the sintering temperature. The sintered body obtained in this way can then be brought into contact with the components to be connected and connect them, and/or be connected to them, by a soldering operation.

The use of sintered bodies in the soldering has the advantage that the sintered body is a shaped component and can be brought into almost any desired geometry. A form that is often used, for example, is a hollow cylinder, which can be introduced together with an electrical contact pin into lead-through openings of metal components, in order to obtain by the soldering a preferably hermetically sealed glass-metal lead-through with an electrically insulated contact pin. This sort of glass-metal lead-through is used in many electrical components and known to a person skilled in the art.

A further preferred application of the crystallizing glass solder and/or composite according to the invention is the production of sheets which comprise the glass solder and/or the composite. Such sheets are similar to the sintered bodies described above but can also be made largely flexible. Shapes can be stamped out of these and can advantageously be used for connecting flat components to one another.

EXAMPLES

The invention will be described below on the basis of the properties of crystallizing glass solders according to the invention and also on the basis of comparative examples.

Firstly, the solder glass was melted in a glass melt. The following properties of the solder glass, generally present in a block, at least in a solid form were measured, the index G indicating the physical properties of the solder glass, which were determined:

$\alpha_{(20-300),G}$ coefficient of linear thermal expansion from 20° C. to 300° C.;

$T_{g,G}$ glass transition temperature or simply transition temperature;

$ST_G$ softening temperature; at this temperature the logarithm of the viscosity is 7.6; and $\rho_G$ density The compositions of examples of the solder glass and their physical properties are summarized in Table I.

After characterization of the solder glass, the generally powdery glass solder is produced from the solder glass by a milling process. In the present examples, a powder having a particle size distribution with a D(50) of about 10 μm and a D(99)<63 μm was provided from the melted solder glasses and processed with a binder to give a dispensable paste. The powder and binder were homogenized by a three-roll mill. The binder is generally an organic substance, such as nitrocellulose, ethylcellulose, or acrylate binder. It generally has no further influence on the properties of the crystallized glass solder, but should be selected so that it can be burned out completely during the heating operation.

The thermal characterization of the glass solders is subsequently carried out by a hot stage microscope. For this purpose, a cylindrical test specimen is molded from the solder glass or composite in powder form to be characterized, and this test specimen is heated on a ceramic stage at 10 K/min.

Changes in shape of the test specimen are observed, with the following characteristic features, to which particular viscosities can be assigned, generally occurring in the case of a non-crystalliizing sample with rising temperature:

Commencement of sintering: At this temperature, the grains of the powder begin to fuse. The height of the test specimen decreases as a result. The logarithm of the viscosity is about 10+/−0.3.

Softening temperature: $ST_K$ This temperature $ST_K$ is characterized by commencement of rounding of the edges of the test cylinder. The logarithm of the viscosity is about 8.2.

Sphere temperature: The temperature at which the logarithm of the viscosity is about 6.1.

Hemisphere temperature: The test specimen has approximately the shape of a hemisphere at this temperature. The logarithm of the viscosity is about 4.6+/−0.1.

Flow temperature: At this temperature, the height of the test specimen is about ⅓ of the initial height. The logarithm of the viscosity is about 4.1+/−0.1.

A clear deviation from this behavior is observed, however, if a crystallization already occurs during the slow heating up of the specimen piece. In this case, the specimen piece can remain stable up to a significantly higher temperature than the base glass that is used as a basis, and then, in a way corresponding to the behavior of a crystalline solid body, it has a kind of melting point at which, in contrast with a glass, a sudden transition to the liquid phase takes place. In this case, it may be that a sphere temperature or a hemisphere temperature cannot be determined.

After completion of the crystallization process, the transition temperature $T_{g,\kappa}$ and the thermal expansion coefficient $\alpha_{(20-300),\kappa}$ of the crystallized glass solder were determined from the dilatometric expansion curve in the temperature range from 20 to 300° C., the properties measured on the crystallized glass solder being indicated by the index κ. The determination of a $T_{g,\kappa}$ is only possible if there is still an amorphous residual phase in the crystallized glass solder. With a completely crystallized sample, a $T_{g,\kappa}$ can no longer be detected.

The thermal properties of the glass solders determined with the hot stage microscope and also the properties after crystallization are likewise summarized in Table I.

TABLE I

Composition and Properties Of The Solder Glass And Of The Crystallizing Glass Solder

| | | B1 | B2 | B3 | B4 | B5 | C1 | C2 |
|---|---|---|---|---|---|---|---|---|
| Composition Of The Solder Glass: | | | | | | | | |
| $SiO_2$ | in % by wt: | 28.1 | 30.8 | 39 | 37 | 35 | 32.4 | 32.0 |
| BaO | in % by wt: | 55.8 | 51.7 | 49.8 | 47.8 | 47.8 | 50.2 | 60.0 |
| $B_2O_3$ | in % by wt: | 10.0 | 8.4 | 11.2 | 11.2 | 11.2 | 3.2 | 7.0 |
| $Al_2O_3$ | in % by wt: | 1.7 | 1.8 | | | | 1.1 | 1.0 |
| CaO | in % by wt: | | | | | 2 | | |
| MgO | in % by wt: | 4.4 | 7.0 | | | | | |
| SrO | in % by wt: | | | | | | 13.1 | |
| $TiO_2$ | in % by wt: | | | | 4 | 4 | | |
| $V_2O_5$ | in % by wt: | | 0.3 | | | | | |
| Physical Properties Of The Solder Glass Before Crystallization: | | | | | | | | |
| $\alpha_{(20-300),G}$ | $10^{-6} K^{-1}$ | 9.1 | 8.8 | 7.7 | 7.53 | 8.1 | 10.0 | 9.4 |
| $Tg,_G$ | ° C. | 622 | 634 | 660 | 668 | 662 | 648 | 643 |
| $ST_G$ | ° C. | 730 | 744 | | | | | |
| $\rho_G$ | g/cm³ | 3.81 | 3.70 | | 3.58 | 3.56 | 3.97 | 3.93 |
| Properties Of The Crystallizing Glass Solder (Hot Stage Microscope) And After Crystallization: | | | | | | | | |
| Start of sintering, | ° C. | 653 | 665 | 700 | 706 | 708 | 683 | 672 |
| $ST_\kappa$ | ° C. | 757 | 779 | 1036 | 984 | 787 | 1096 | 1045 |

TABLE I-continued

Composition and Properties Of The Solder Glass And Of The Crystallizing Glass Solder

|  |  | B1 | B2 | B3 | B4 | B5 | C1 | C2 |
|---|---|---|---|---|---|---|---|---|
| Sphere temperature, | °C. | 786 | — |  |  | 862 | — | — |
| Hemisphere Temperature, | °C. | 853 | 876 | 1063 | 1010 | 1002 | 1158 | 1127 |
| Flow temperature, | °C. | 906 | 951 | 1074 | 1027 | 1021 | 1165 | 1137 |
| $\alpha_{(20-300),\kappa}$, | $10^{-6} K^{-1}$ | 9.8 | 9.9 | 11.3 | 12.5 | 10.21 | 11.4 | — |
| $Tg,_{\kappa}$, | °C. | 614 | 624 |  |  |  | — | — |

The fact that Tg, κ can be determined from the thermal expansion curve shows the presence of a residual glass phase. The slightly lower Tg, κ, in comparison with amorphous solder glass can be explained by the depletion of $SiO_2$ in the glass phase, since barium silicates (for example $Ba_5Si_8O_{21}$) are formed. The amorphous residual glass phase of the systems according to the invention makes the glass solder less brittle, which has positive effects on the mechanical strength. Therefore, after crystallization, the systems according to the invention preferably have a crystalline fraction of from 20% to 80%, and correspondingly a residual glass phase of from 20% to 80% by weight. No crystallization in the glass solder and complete crystallization of the glass solder are both undesirable.

The glass solders of the comparative examples C1, C2 and C3 do not have the behavior desired according to the invention. The extremely high STκ of C1 and C2 indicates a crystallization commencing very early, that is to say a strong tendency to crystallize. The strong tendency to crystallize of comparative example C1 can be attributed to the low $B_2O_3$ content of only 3.2%. The strong tendency to crystallize of comparative example C2 can be attributed to the absence of further alkaline earth metal oxides of the group comprising CaO, MgO and SrO in conjunction with the high barium fraction and the low $B_2O_3$ content in comparison with examples B1 and B2. The strong tendency to crystallize of comparative example C3 can likewise be attributed to the absence of further alkaline earth metal oxides.

The examples B1 to B5, on the other hand, have the behavior desired according to the invention. These achieve hemisphere temperatures significantly below 1100° C.

The solder glass of example B1 was accordingly used as a base glass for the production of composites, with between 10% and 25% of fillers being added to the powder. By analogy with the filler-free solder glasses, the same properties were determined for the composites obtained and are summarized in Table II in comparison with the filler-free solder glass. Also given in Table II is the linear thermal expansion coefficient $\alpha_{(20-750),\kappa}$, which characterizes the thermal expansion properties of the composite in the temperature range from 20° C. to 750° C. This value demonstrates that the thermal expansion coefficient is in the target range over the entire temperature range that is relevant for processing. Furthermore, the value shows that the sample has crystallized. The value cannot be determined on the base glass from example 5 without fillers, since it has a $ST_G$ of 730° C., and consequently softens before 750° C. is reached. In particular when assessing the thermal cycling ability of the materials, the coefficient of thermal expansion $\alpha_{(20-750),\kappa}$ is more relevant than the $\alpha_{(20-300),\kappa}$.

TABLE II

Properties of Composites based on Example B1 (hot stage microscope) and After Crystallization

|  |  | B1 | 90% B1 + 10% 3YSZ | 85% B1 + 15% BaSiO3 | 75% B1 + 25% BaSiO3 |
|---|---|---|---|---|---|
| Start of sintering | °C. | 653 | 655 | 705 | 660 |
| Softening temperature, $ST_K$ | °C. | 757 | 785 | 858 | 908 |
| Sphere temperature, | °C. | 786 | — | 895 | — |
| Hemisphere Temperature, | °C. | 853 | 877 | 1007 | 944 |
| Flow temperature | °C. | 906 | 931 | 1120 | 991 |
| $\alpha_{(20-300),\kappa}$ | $10^{-6} K^{-1}$ | 9.8 | 10.0 | 9.5 | 10.3 |
| $\alpha_{(20-750),\kappa}$ | $10^{-6} K^{-1}$ | Cannot be determined, since already softened | 14.2 | 12.7 | 13.2 |

The comparison with B1 shows that, in the case of adding 10% of 3YSZ or 25% of $BaSiO_3$ (sanbornite), the coefficient of thermal expansion $\alpha_{(20-300),\kappa}$ of the composite is greater than that of the crystallized glass solder alone, while in the case of adding 15% of $BaSiO_3$ the value is smaller. This shows that both a positive and a negative adaptation of the coefficient of thermal expansion can be achieved by selecting the fillers and the amount thereof.

The hemisphere temperatures, and consequently also the soldering temperatures, are higher in the case of the composites shown in Table II than in the case of example B1. However, the flow temperature in the case of the composites is higher than that of example B1.

With the composites according to the invention, joints were successfully produced with a metal interconnecting material. Firstly, the joint was heated up at a heating rate of 5 K/min to 450° C. and kept at 450° C. for 30 minutes. Subsequently, the joint was heated up further at 2 K/min to 950° C. and kept at that temperature for 30 minutes. Subsequently, the joint was cooled down at 2 K/min to 860° C. and kept at that temperature for 10 hours. Cooling down to room temperature was likewise carried out at 2 K/min. During the joining operation, the joint was subjected to a static weight (about 15 g/cm$^2$).

The crystallizing glass solders and composites according to the invention combine all the positive properties according to the object of the invention. The solder glass can be produced as an initial product with good melting behavior and melting temperatures that are not too high by conventional melting processes. It has a thermal expansion in the desired range and, in particular, does not have too strong a tendency to crystallize or a tendency to crystallize spontaneously. The composition effectively prevents the formation of undesirable crystal phases, which makes low-stress joints which are stable in the long term possible.

The composites according to the invention can be adapted to the thermal expansion of the interconnecting materials over a great range by means of different fillers.

The follow examples Y1 and Y2 shown in Table III illustrate preferred embodiments of the glass solders that contain $Y_2O_3$. These embodiments are particularly desirable for fuel cell applications, especially SOFC, because they have low porosity and are stable with respect to a moist fuel gas atmosphere.

TABLE III

Exemplary Embodiments containing $Y_2O_3$

| Example | Y1 | Y2 |
|---|---|---|
| Composition in wt. %: | | |
| $SiO_2$ | 26.1 | 25.07 |
| $Al_2O_3$ | 1.5 | 1.5 |
| $B_2O_3$ | 9.4 | 8.88 |
| BaO | 52.54 | 49.67 |
| MgO | 2.93 | 1.58 |
| $Y_2O_3$ | 7.03 | 13.3 |
| Properties: | | |
| $\alpha_{(20\text{-}300)}$ {$10^{-6}$/K} (vitreous) | 8.9 | 8,8 |
| $\alpha_{(20\text{-}300)}$ {$10^{-6}$/K} (48 h @ 850° C.) | 9.2 | 9 |
| Tg (° C.) | 642 | 659 |
| Density, g/cm$^3$ (vitreous) | 3.92 | 3.99 |
| Processing temperature at 100 dPas, ° C. | 908 | 936 |
| Density, g/cm$^3$ (48 h @ 850° C.) | 3.62 | 3.85 |

The crystallizing glass solders and composites according to the invention make it possible for joints which allow high operating temperatures of approximately 850° C. to be obtained at low processing temperatures of at most approximately 1000° C. Furthermore the good wetting of the interconnecting materials due to the slow crystallization taking place only after the solder has been introduced makes joints which are stable in the long term possible.

While the invention has been illustrated and described as embodied in crystallizing glass solder and use thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A crystallizing glass solder for high-temperature applications, wherein said crystallizing glass solder contains, in percent by weight on an oxide basis, 25 to 40%, $SiO_2$; <2, $Al_2O_3$; 5 to 15%, $B_2O_3$; 45 to 60%, BaO; 0 to 5%, CaO; 0.1 to 15% $Y_2O_3$; and 0 to 20% of a sum total of MgO, CaO and SrO.

2. The crystallizing glass solder according to claim 1, containing from 3 to 15% of $Y_2O_3$.

3. The crystallizing glass solder according to claim 1, containing from 3 to 8% of $Y_2O_3$.

4. The crystallizing glass solder according to claim 1, containing from 2 to 15% of said sum total of MgO, CaO and SrO.

5. The crystallizing glass solder according to claim 1, which is free of PbO and $TeO_2$.

6. The crystallizing glass solder according to claim 1, containing, in percent by weight on said oxide basis, from 0 to 3% of CaO.

7. The crystallizing glass solder according to claim 1, wherein a sum total amount of $SiO_2$ and $B_2O_3$, in percent by weight on said oxide basis, is from 30 to 53%.

8. The crystallizing glass solder according to claim 1, wherein a sum total amount of $SiO_2$ and $B_2O_3$, in percent by weight on said oxide basis, is from 36 to 51%.

9. The crystallizing glass solder according to claim 1, having a coefficient of thermal expansion in a vitreous state, $\alpha_{(20\text{-}300), G}$, of $6 \cdot 10^{-6}$ K$^{-1}$ to $11 \cdot 10^{-6}$ K$^{-1}$ and/or a coefficient of thermal expansion in a crystallized state, $\alpha_{(20\text{-}300), K}$, of $8 \cdot 10^{-6}$ K$^{-1}$ to $13 \neq 10^{-6}$ K$^{-1}$.

10. The crystallizing glass solder according to claim 1, additionally containing, in percent by weight on said oxide basis, up to 0.5% of $V_2O_5$ and/or $Sb_2O_3$ and/or CoO.

11. The crystallizing glass solder according to claim 1, additionally containing, in percent by weight on said oxide basis, up to 5% of $ZrO_2$.

12. The crystallizing glass solder according to claim 1, wherein a molar ratio of $SiO_2$ to BaO is less than 2.5.

13. The crystallizing glass solder according to claim 12, wherein said molar ratio is less than 2.3.

14. The crystallizing glass solder according to claim 1, having a hemisphere temperature of 850° C. to 1080° C.

15. The crystallizing glass solder according to claim 1, wherein a difference between thermal expansion coefficients $\alpha_{(20\text{-}300)}$ before and after a crystallization process is less than $2 \cdot 10^{-6}$ K$^{-1}$.

16. The crystallizing glass solder according to claim 15, wherein said difference is less than $1 \cdot 10^{-6}$ K$^{-1}$.

17. The crystallizing glass solder according to claim 1, wherein at least 10% by weight of the glass solder is in an amorphous phase.

18. A crystallizing glass solder for high-temperature applications, said crystallizing glass solder containing, in percent by weight on an oxide basis, 22 to 29%, $SiO_2$; <2%, $Al_2O_3$; 6 to 12%, $B_2O_3$; 46 to 55%, BaO; 1 to 4%, MgO; and 5 to 15%, of $Y_2O_3$.

19. A composite comprising a crystallizing glass solder and up to 35 wt. % of a crystalline filler;
wherein said crystallizing glass solder has a composition, in percent by weight on an oxide basis, according to claim 1.

20. The composite according to claim 19, wherein said crystalline filler comprises sanbornite, 3YSZ, wollastonite and/or enstatite.

21. The composite according to claim 19, having a coefficient of thermal expansion, $\alpha_{(20-750),K}$, of $9.5 \cdot 10^{-6}$ K$^{-1}$ to $14.5 \cdot 10^{-6}$ K$^{-1}$.

22. The composite according to claim 19, having a hemisphere temperature of 850° C. to 1100° C.

23. The composite according to claim 19, wherein a difference between thermal expansion coefficients $\alpha_{(20-300)}$ before and after a crystallization process is less than $2 \cdot 10^{-6}$ K$^{-1}$.

24. The composite according to claim 23, wherein said difference is less than $1 \cdot 10^{-6}$ K$^{-1}$.

25. The composite according to claim 19, wherein at least 10% by weight of the composite is in an amorphous phase.

26. A composite comprising a crystallizing glass solder and up to 35 wt. % of a crystalline filler;
wherein said crystallizing glass solder has a composition, in percent by weight on an oxide basis, according to claim 18.

27. A high-temperature joint comprising a crystallizing glass solder according to claim 1.

28. The high-temperature joint according to claim 27, which is configured for a fuel cell.

29. A high-temperature joint comprising a crystallizing glass solder;
wherein said crystallizing glass solder contains, in percent by weight on an oxide basis, 22 to 29%, $SiO_2$; <2%, $Al_2O_3$; 6 to 12%, $B_2O_3$; 46 to 55% BaO; 1 to 4%, MgO; and 5 to 15%, of $Y_2O_3$.

30. A sintered body having a high-temperature resistance, said sintered body comprising a crystallizing glass solder according to claim 1.

31. The sintered body having a high-temperature resistance according to claim 30, further comprising a crystallizing filler.

32. A sheet having a high-temperature resistance, said sheet comprising a crystallizing glass solder according to claim 1.

33. The sheet having a high-temperature resistance according to claim 32, further comprising a crystalline filler.

* * * * *